United States Patent
Yao et al.

(10) Patent No.: US 7,292,732 B2
(45) Date of Patent: Nov. 6, 2007

(54) IMAGE COMPRESSION/DECOMPRESSION APPARATUS AND METHOD

(75) Inventors: Shun-Yen Yao, Taipei (TW);
Ching-Lung Mao, Taipei (TW);
Mei-Hua Fan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 729 days.

(21) Appl. No.: 10/830,062

(22) Filed: Apr. 23, 2004

(65) Prior Publication Data

US 2005/0238245 A1    Oct. 27, 2005

(51) Int. Cl.
*G06K 9/36* (2006.01)
*G06K 9/46* (2006.01)

(52) U.S. Cl. .................................... 382/244
(58) Field of Classification Search ............... 382/244, 382/247, 238; 358/426.13, 426.16
See application file for complete search history.

(56) References Cited

U.S. PATENT DOCUMENTS 5,442,458 A * 8/1995 Rabbani et al. ............. 382/247
6,285,790 B1 * 9/2001 Schwartz .................... 382/234

* cited by examiner

*Primary Examiner*—Phuoc Tran
(74) *Attorney, Agent, or Firm*—Harness, Dickey & Pierce, P.L.C.

(57) ABSTRACT

An image compression apparatus includes an image transformer for transforming each pixel of an image data into binary bit array. The bits of a same bit plane are located in a same column. A context modeler, coupled to the image transformer, includes a context model template and a context model. When the bit array is imported, a plurality of reference context bits for a bit to be compressed is determined by means of the context model template. The bit to be compressed and the plurality of reference context bits are on a same bit plane. A mathematic encoder, coupled to the context modeler, encodes the bit to be compressed according to the context modeler and the information provided by the plurality of reference context bits.

14 Claims, 8 Drawing Sheets

IMAGE COMPRESSION/DECOMPRESSION APPARATUS AND METHOD

BACKGROUND OF THE INVENTION

1. Field of the Invention

The invention generally relates to an image compression and decompression apparatus and method, and in particular relates to an image compression and decompression apparatus and method utilizing a context modeler having a specific context model template and a context model.

2. Related Art

Joint Bi-level Image Group (JBIG) is mainly a data processing method similar to static image compression and also including decompression method. The major difference of JBIG from static image compression is that JBIG losslessly compresses binary (one-bit/pixel) images. The image compressed by JBIG can be retrieved without losing fidelity after decompression. The intent of JBIG is to replace the current, less effective G3 and G4 fax algorithms. Fax machine has been an essential facility under the office automation needs. However, current fax machines using static image compression have their drawbacks, such as: 1) a whole faxed document cannot be viewed through a terminal due to the limited resolution of the terminal; 2) the image data does not support progressive coding so that the image content can only be obtained after the whole document being outputted from the fax machine, and 3) the quality of faxed output from a grayscale image becomes very poor. This is caused by a bitmap process of the scanner that changes the grayscale image into bitmap (black and white by a threshold) and neglects the grayscale. Therefore, JBIG intends to solve the aforesaid problems and compresses document images into a specific format to be used by scanners, digital cameras, fax machines or other image input and transference devices.

The JBIG compression has the following characteristics: 1) adaptive coding; 2) lossless image compression;. An adaptive arithmetic coding is applied. It also operates compression of halftone image. The JBIG compression is supposed to have the following advantages: 2) it handles multi-level image compression; 3) less compression time; 4) less decompression time; and 5) higher compression ratio.

Two compression and decompression methods are included in the current JBIG coding. In the following descriptions, they are identified as method A and method B.

Figure 1:
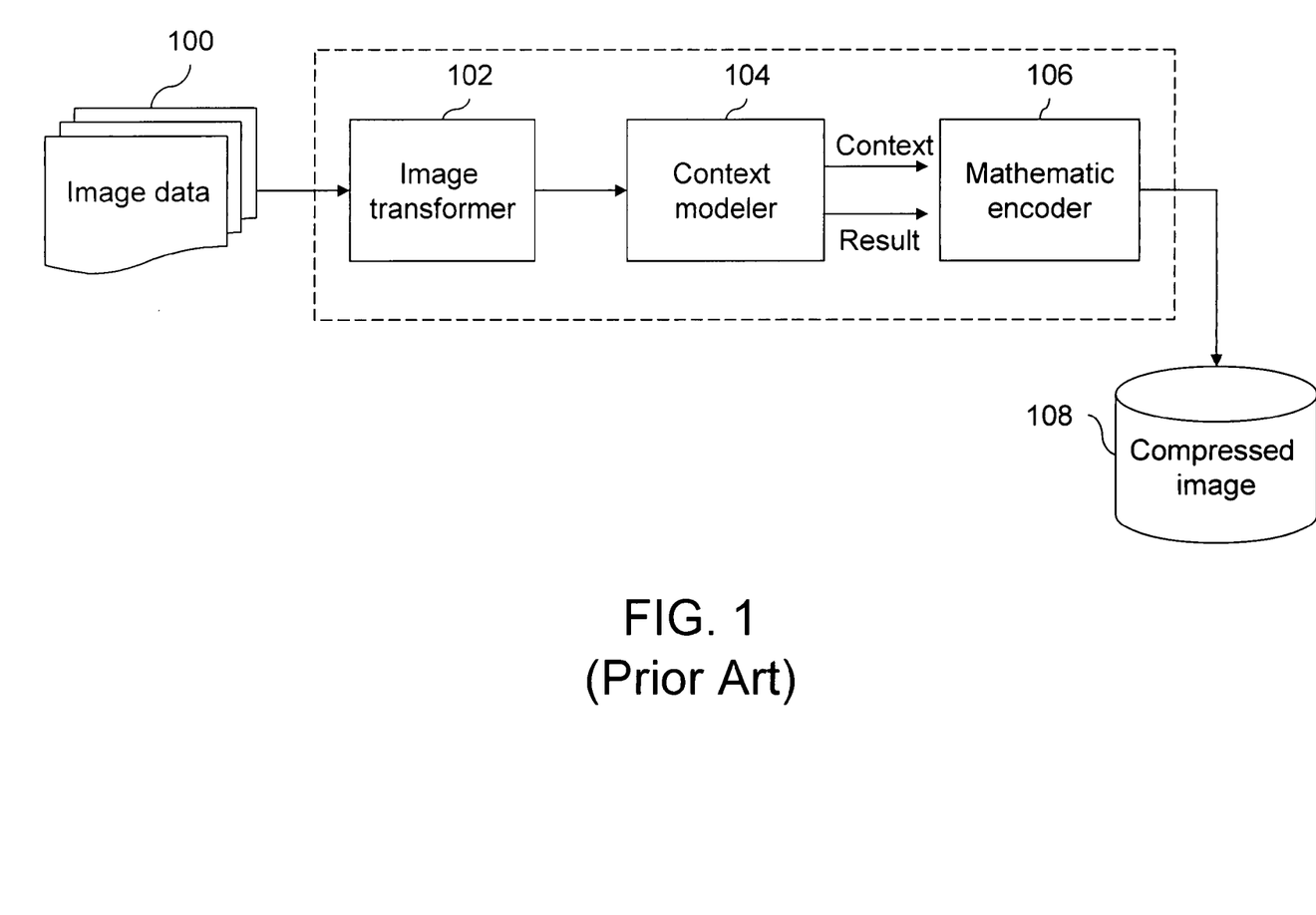
FIG. 1 is a composition of an image compression apparatus of prior arts.
Figure 2:
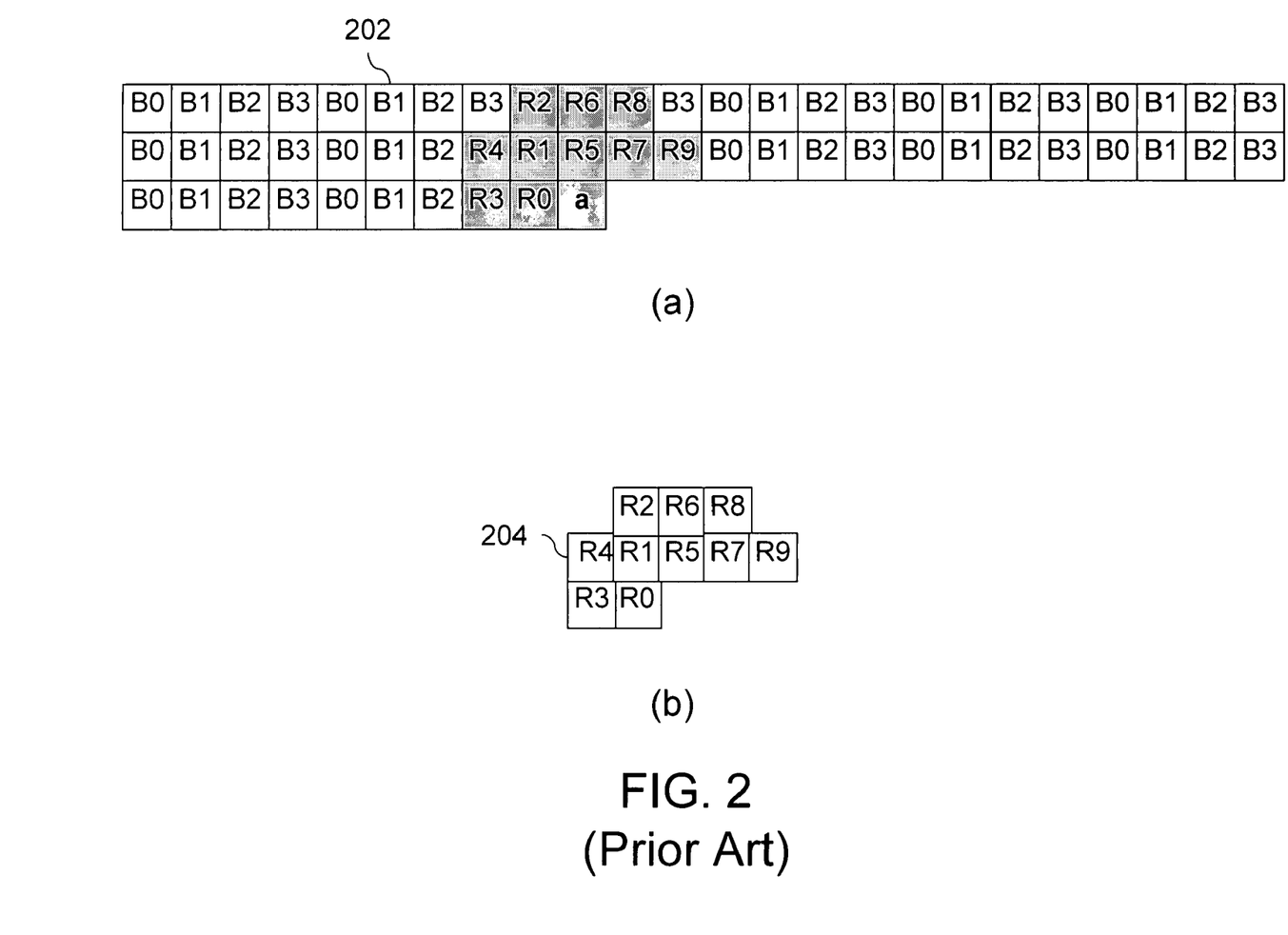
FIG. 2 is an explanatory view of a context model template and a context model in a context modeler utilizing a compression method A of prior arts.

FIG. 1 shows three major portions of the compression/decompression process of method A. They are an image transformer 102, a context modeler 104 and a mathematic encoder 106. The image data 100 to be compressed by JBIG is first transformed into bit array before being processed by the context modeler 104. The context modeler 104 compresses the data through the encoder 106 according to context model template and context model of the JBIG standard. The context model template 202 and context model 204 included in the context modeler 104 are shown in (a) and (b) of FIG. 2 respectively. Each pixel of the image is composed of four bits (B0, B1, B2, B3) in FIG. 2. The image data is transformed into bit data. In the context model template 202 of the context modeler 104, the bit to be compressed is labeled "a". According to the context model 204, ten reference context bits are used to decide the compression of the bit "a". The ten reference context bits are: three bits (R0, R1, R2) on the left column of "a"; two bits (R3, R4) on further left column and starting from a same row; two bits (R5, R6) on top of "a"; two bits (R7, R8) on the right column and starting from an upper row; and a bit (R9). The ten reference context bits and the bit "a" are processed by the mathematic encoder 106 with JBIG format and transformed into a compressed file 108. The aforesaid method A is usually applied to monochrome image compression. The advantage is that the data do not need cutting and rejoining so as to save time. The disadvantage is that the reference context bits are on different bit planes, so their correlations and the compression ratio are less.

Figure 3:
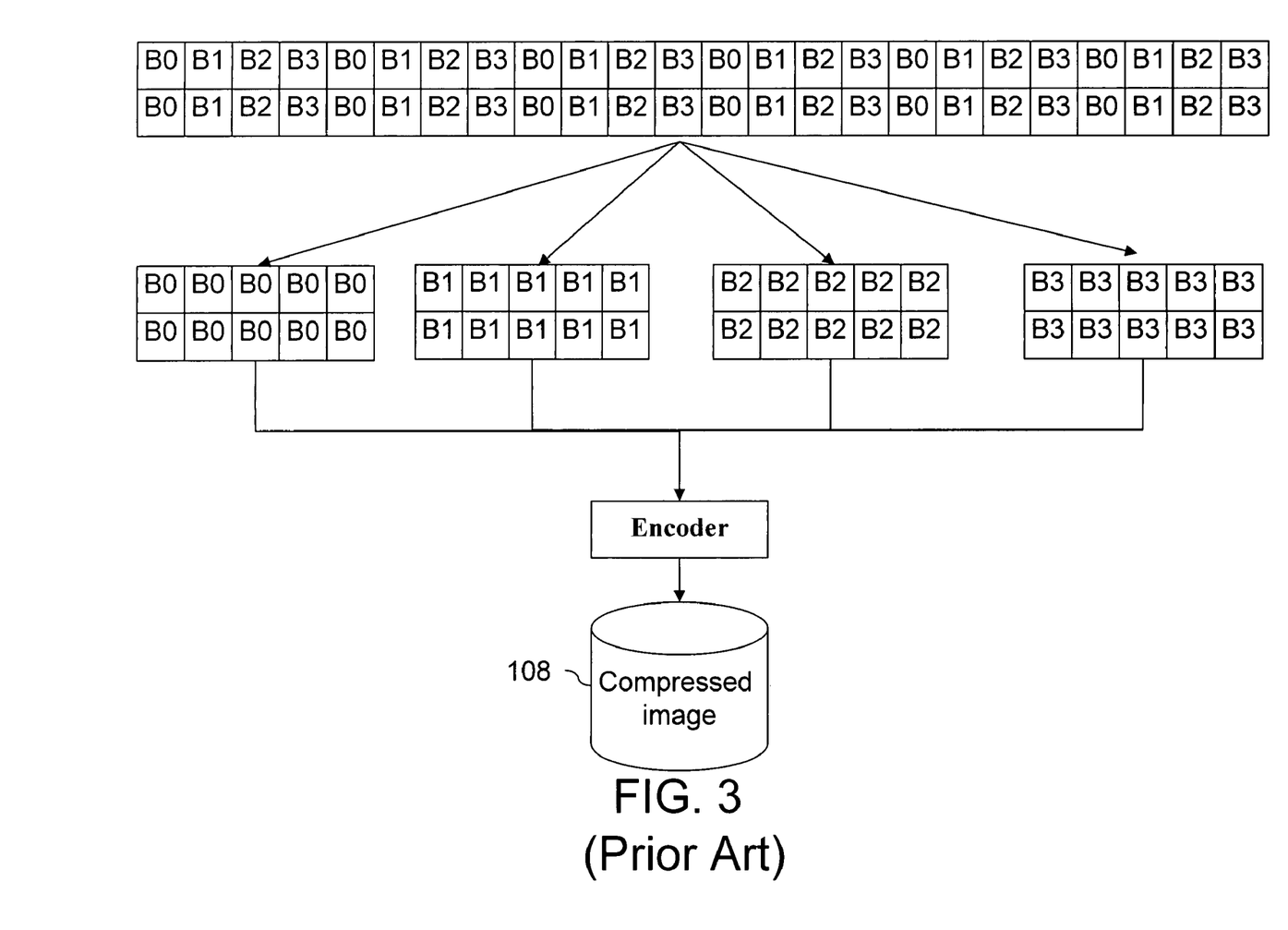
FIG. 3 is an explanatory view of a compression method B of prior arts.

FIG. 3 shows an example of compression process of method B of JBIG. The image data is also transformed through an image transformer 102 of FIG. 1, through an un-shown bit plane transformer, and divided into four bit groups (B0, B1, B2, B3) respectively located on four bit planes B0, B1, B2, B3. The bit groups are transferred to a context modeler 104. The context modeler 104 compresses the data through a mathematic encoder 106 according to the context model template and context model of the JBIG standard. The aforesaid method B is usually applied to monochrome image compression. The advantage is that the bit groups are of same bit planes, so their correlations and the compression ratio are high. The disadvantages are that the data have to be cut and rejoined so it costs time and requires higher investment of software and hardware.

SUMMARY OF THE INVENTION

The object of the invention is to provide a JBIG image data compression/decompression method that has both advantages of prior methods A and B of JBIG and solves their disadvantages. That means, the invention processes fast as method A, high compression ratio as method B, while being free from the longer processing time, higher investment of method B, and the lower compression ratio of method A.

An image compression and decompression apparatus according to the invention includes an image transformer for transforming each pixel of an image data into binary bit array. The bits of a same bit plane are located in a same column. A context modeler, coupled to the image transformer, includes a context model template and a context model. When the bit array is imported, a plurality of reference context bits for a bit to be compressed is determined by means of the context model template. The bit to be compressed and the plurality of reference context bits are on a same bit plane. A mathematic encoder, coupled to the context modeler, encodes the bit to be compressed according to the context modeler and the information provided by the plurality of reference context bits.

An image compression method according to the invention is applied to a compression apparatus including an image transformer, a context modeler composed of a context model template and a context model, and an encoder, for compressing a plurality of pixels of an image. Each pixel is represented by at least a bit with a color value and its location in the image. The bits are located on different bit planes. The method includes the following steps. Transform all pixels of an image into a bit array that includes different bit planes each having a plurality of bits located in a same column. Determine the number of column spacing of context model according to the number of bits of each pixel. Determine a shape of context model correspondent to the context model template. Cover a range of reference context bits in the bit array for a bit to be compressed. In the range, obtain a plurality of reference context bits in the same bit plane of the bit to be compressed by using the context model. Then, encode the bit to be compressed by using the data of the reference context bits.

BRIEF DESCRIPTION OF THE DRAWINGS

The invention will become more fully understood from the detailed description given herein below. However, this description is for purposes of illustration only, and thus is not limitative of the invention, wherein.

DETAILED DESCRIPTION OF THE INVENTION

Figure 4:
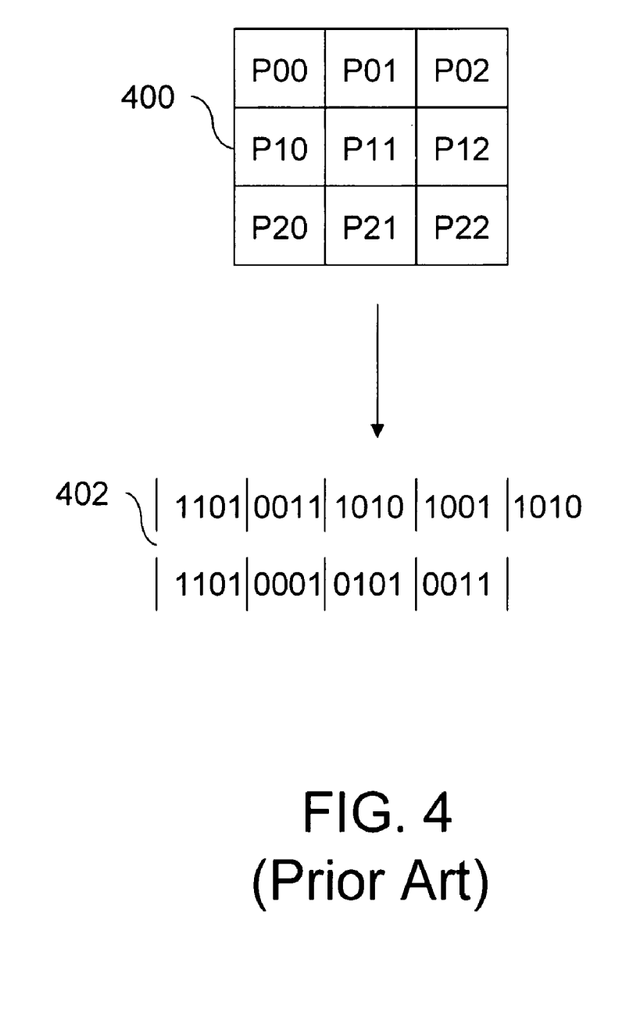
FIG. 4 is an example of bit array transforming of a 3*3 pixels bitmap image.

A digital image is represented by a two-dimensional pixel array, in which each pixel has a position in the image grid. For a color image, each pixel has a color value. For example, as shown in FIG. 4, a bitmap image 400 has 3*3 pixels. However practically, an image may include much more, such as 1024*1024, color pixels; and each pixel can be selected from one of 16.8 million (24-bit) colors.

The upper portion of FIG. 4 illustrates a 3*3 pixels image 400. Each pixel is labeled as P00, p01, p10, etc., in which the first number represents the row position of the pixel, and the second number represents the column position of the pixel.

Supposing each pixel in FIG. 4 is represented by 4 bits (each bit is 1 or 0). However actually, a pixel can be represented by 2 bits, 6 bits, 8 bits or others according to the application requirements. Then, in the lower portion of FIG. 4, a bit array 402 correspondent to the image 400 is presented. The 4-bit value represents the position and color of the pixel. In the bit array 402, the bit values in a same column represent a same characteristic of different pixels, and are in a same bit plane. In prior arts, data in different bit planes are compressed respectively. The method of the invention does not compress this way, but to collect the bit positions according to the pixel location for the mathematic encoder to process and get a high compression ratio. The context model is changed by using a context model template in the context modeler and arranging the bit to be compressed and the reference context bits on a same bit plane. Because the bits on a same bit plane are much correlative, the reference context bits obtained by the context model and provided for compression of the bit to be compressed get a better result. A detailed description and preferred embodiments of the invention will be described as follows.

Figure 5:
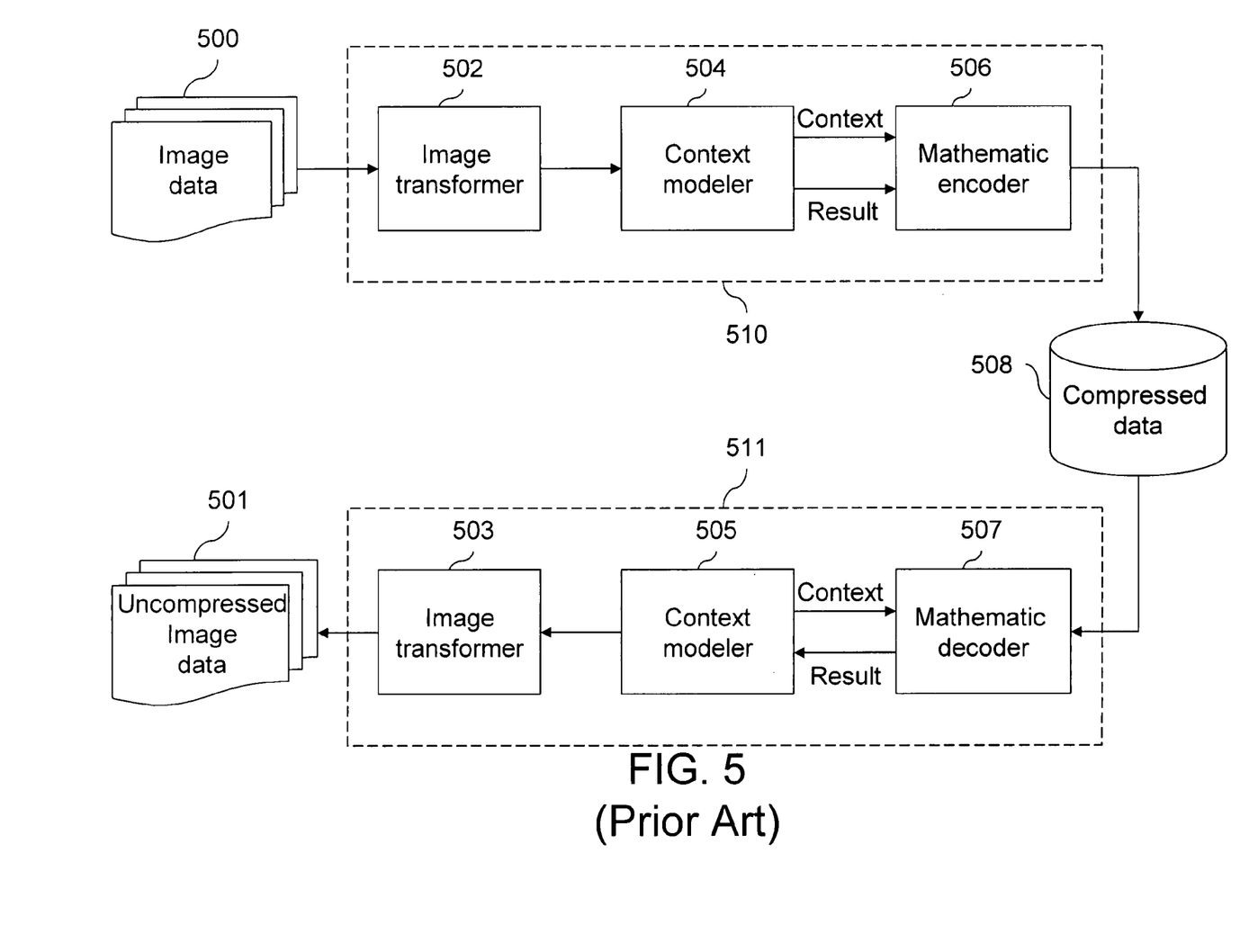
FIG. 5 is composition of an image compression and decompression apparatus utilizing a method of the invention.

FIG. 5 shows a compressor 510 and a decompressor 511 applying the method of the invention. The compressor 511 receives an original image data 500, compresses it into a compressed data 508. Afterwards, the uncompressor 511 processes the compressed data 508, uncompresses it to get an image data 501 that is a lossless copy of the original image data 500.

The compressor 510 includes an image transformer 502, a context modeler 504 and a mathematic encoder 506. The decompressor 511 includes a context modeler 505, a mathematic decoder 507 and an image transformer 503. The image data 500, 501, 508 are stored in memory blocks of a computer, fax machine, printer or other application devices.

In the compressor 510, the image transformer 502 includes an input port for receiving image data, an output port for outputting image bit array. The context modeler 504 includes an image bit array input port and two output ports. One output port provides output result; the other output port provides context of the result. The mathematic encoder 506 includes input ports of result and context, and an output port for outputting compressed bit data to be stored in the compressed image data 508.

In the decompressor 511, the mathematic decoder 507 includes an input port for receiving compressed bit data, an input port for receiving context and an output port for outputting result. The context modeler 505 includes an input port for receiving the result of the mathematic decoder, an output port for outputting context to the mathematic decoder 507 and an output port for outputting image bit array. The image transformer 503 includes an input port for receiving image bit array, and an output port for outputting image data.

In the global communication (via telecommunication or Internet) environment, through the aforesaid compressor 500 and decompressor 511, an image data 500 can be first compressed into a compressed data 508 and transferred to a remote terminal, decompressed there for a user to view. The terminal includes a decompressor 511 for uncompressing the data. The user can decide whether or not to store the image data.

Figure 6A:
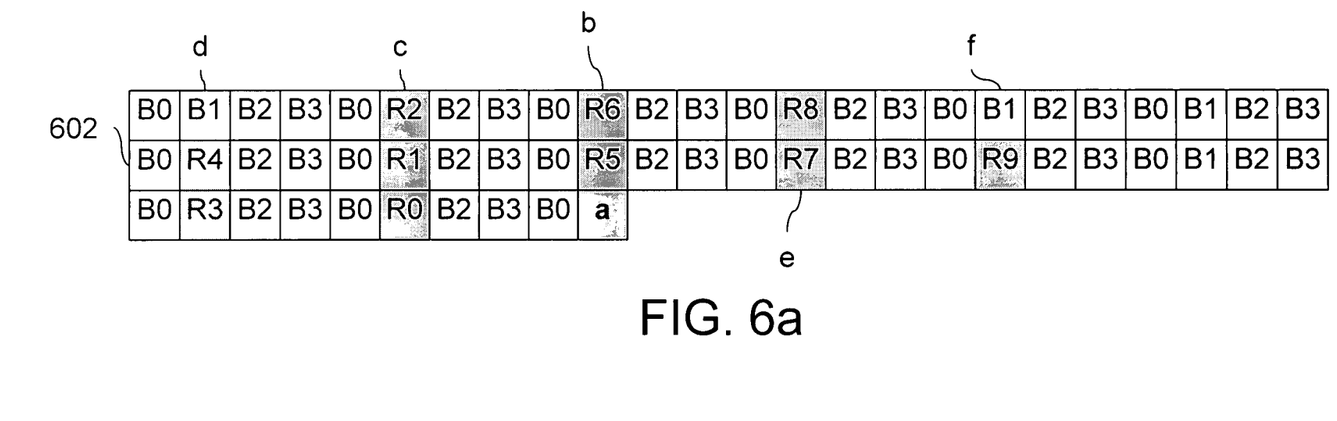
FIG. 6a, 6b is an explanatory view of a context model template and a context model in a context modeler utilizing a compression method of the invention.
Figure 6B:
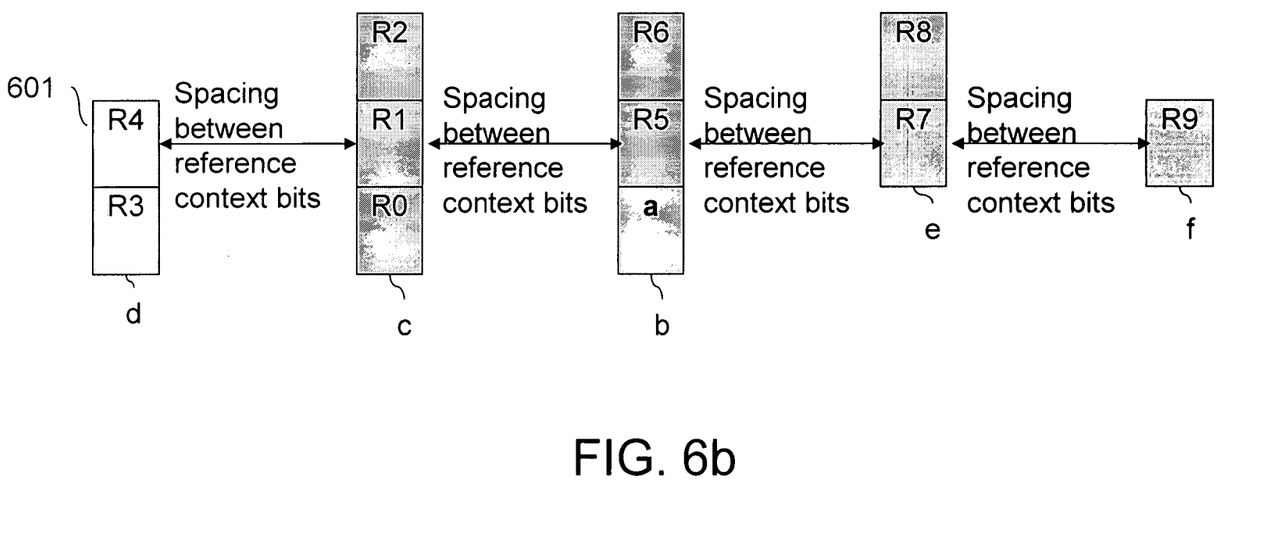

FIG. 6a, 6b is an explanatory view of a context model template 602 and a context model 601 in a context modeler 504 of the aforesaid compressor 510. The context model template 602 identifies the relationship of a bit to be compressed and its potential reference context bits. The reference context bits provide useful context when encoding the bit to be compressed in the compression/decompression process. In the context model template 602, a pixel is represented, for example, by four bits (B0, B1, B2, B3). A bit to be compressed is marked as "a". The surrounding potential reference context bits of a same bit plane are marked with a same bit name (B0, B1, B2 or B3). Therefore, the bit data of a same column belong to a same bit plane. Practically, the reference context bits used in the context model 601 are less than the available reference context bits in the context model template 602. For example, the context model 601 in FIG. 6b is generated form the context model template 602 of FIG. 6a. For the bit "a" to be compressed, ten reference context bits R0 to R9 as shown in FIG. 6b are identified from the context model template of FIG. 6a.

From FIG. 6a, ten bits for the bit "a" to be compressed are identified as reference context bits. The reference context bits are on the same bit plane of the bit "a" and located on top, left and right portions of the bit "a". For example, in the context model template 602, the bit "a" is on the B1 bit plane, so the reference context bits include three bits (R0, R1, R2) on a column c of the same B1 bit plane by spacing three columns leftwards from "a"; two bits (R3, R4) on a column d of the same B1 bit plane by spacing seven columns leftwards from "a"; two bits (R5, R6) on top and in the same column b of the bit "a"; two bits (R7, R8) on a column e of the same B1 bit plane by spacing three columns rightwards from "a"; and a bit (R9) on a column f of the same B1 bit plane by spacing seven columns rightwards from "a". In conclusion, the reference context bits are defined by some bits surrounding the bit to be compressed with a spacing of columns. The number of columns for spacing is calculated from the number of bits of the image pixel:

Number of columns for spacing=number of bits of pixel−1

For example, the number of bits of the image pixel is 4, so the number of columns for spacing is 3 as above. In three columns leftwards and rightwards, there are reference context bits R0, R1, R2 and R7, R8 in the columns c and e. In the further three columns leftwards and rightwards from the columns c and e, there are reference context bits R3, R4 and R9 on the columns d and f. Therefore, as shown in the context model template 601 and the context model 602 of FIGS. 6a and 6b, ten reference context bits R1 to R9 are provided along with the bit "a" to the mathematic encoder for compression encoding.

Figure 7A:
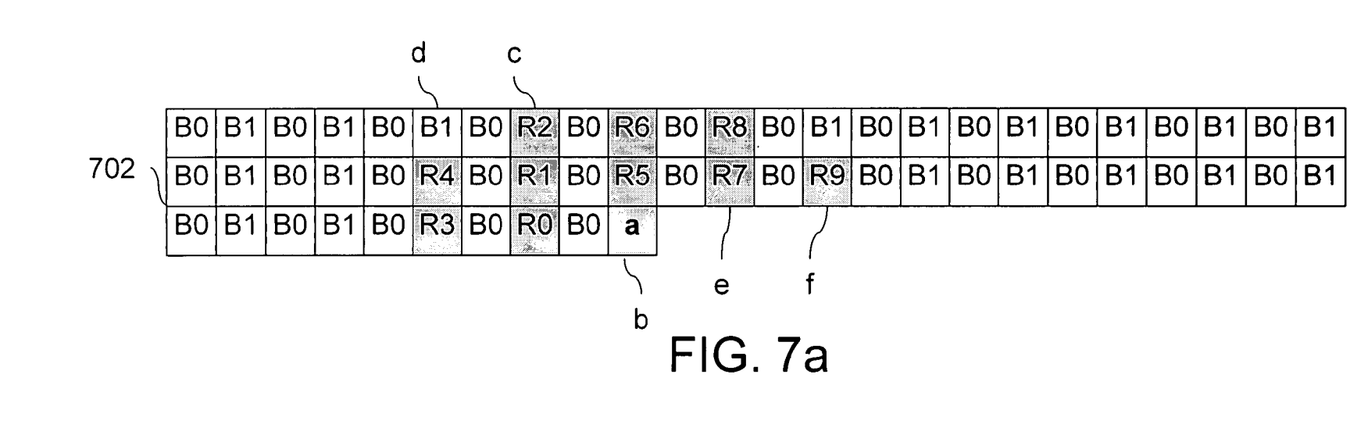
FIG. 7a, 7b is another explanatory view of a context model template and a context model in a context modeler utilizing a compression method of the invention.
Figure 7B:
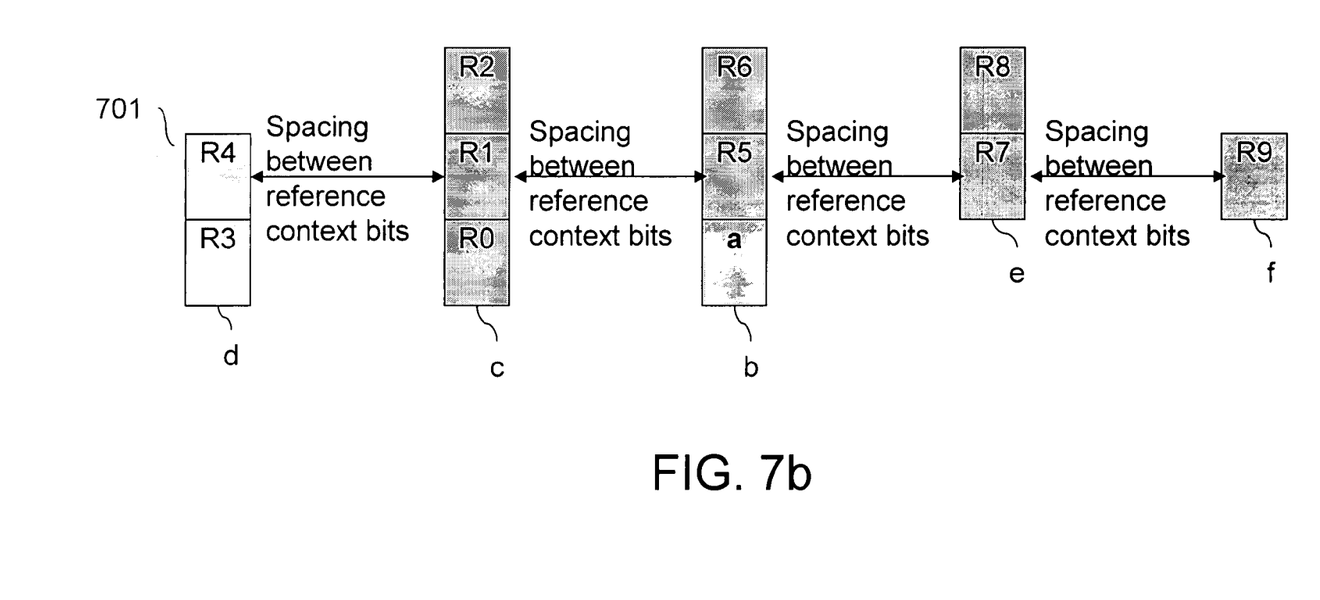

FIG. 7a, 7b is another explanatory view of a context model template 702 and a context model 701 in a context modeler 504 of the aforesaid compressor 510. In the context model template 702, a pixel is represented by two bits (B0, B1). A bit to be compressed is marked as "a". The surrounding potential reference context bits of a same bit plane are marked with a same bit name (B0 or B1). Therefore, the bit data of a same column belong to a same bit plane. The context model 701 in FIG. 7b is generated form the context model template 702 of FIG. 7a. For the bit "a" to be compressed, ten reference context bits R0 to R9 as shown in FIG. 7b are identified from the context model template of FIG. 7a.

From FIG. 7a, ten bits for the bit "a" to be compressed are identified as reference context bits. The reference context bits are on the same bit plane of the bit "a" and located on top, left and right portions of the bit "a". For example, in the context model template 702, the bit "a" is on the B1 bit plane, so the reference context bits include three bits (R0, R1, R2) on a column c of the same B1 bit plane by spacing one column leftwards from "a"; two bits (R3, R4) on a column d of the same B1 bit plane by spacing three columns leftwards from "a"; two bits (R5, R6) on top and in the same column b of the bit "a"; two bits (R7, R8) on a column e of the same B1 bit plane by spacing one column rightwards from "a"; and a bit (R9) on a column f of the same B1 bit plane by spacing three columns rightwards from "a". In conclusion, the reference context bits are defined by some bits surrounding the bit to be compressed with a spacing of columns. The number of columns for spacing is calculated from the number of bits of the image pixel:

Number of columns for spacing=number of bits of pixel−1

For example, the number of bits of the image pixel is 2, so the number of columns for spacing is 1 as above. In one column leftwards and rightwards, there are reference context bits R0, R1, R2 and R7, R8 in the columns c and e. In the further one columns leftwards and rightwards from the columns c and e, there are reference context bits R3, R4 and R9 on the columns d and f. Therefore, as shown in the context model template 701 and the context model 702 of FIGS. 7a and 7b, ten reference context bits R1 to R9 are provided along with the bit "a" to the mathematic encoder for compression encoding.

Further referring to FIG. 5, for the decompression process, the context modeler 505 also includes context model template and context model as described above for obtaining bit array of image to be transformed by the image transformer 503 and obtaining the decompressed image data 501.

Though the aforesaid context model template and context model of a context modeler is described with 4-bit or 2-bit pixels, the number of bits is not limited to this. Any reasonable number of bits for the image pixels can be applied for the context modeler in the compression and decompression processes.

Figure 8:
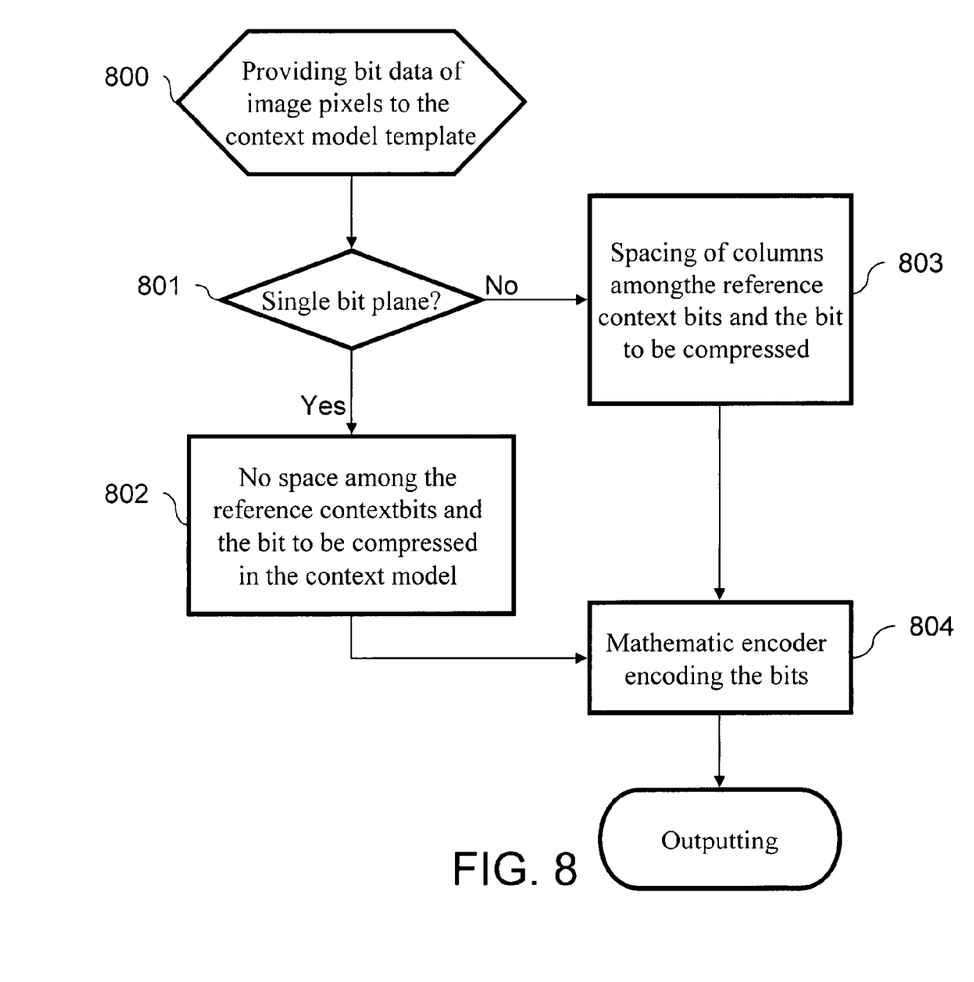
FIG. 8 is a flowchart of a compression method of the invention.

FIG. 8 is a flowchart of a compression method of the invention. Firstly, providing bit data of image pixels to the JBIG context model template (step 800). Judging if there are single or multiple bit planes (step 801). There will be no space among the reference context bits and the bit to be compressed in the context model if there is a single bit plane (step 802). Otherwise, there is a spacing of (number of bits of pixel-1) columns among the reference context bits and the bit to be compressed (step 803) for a multiple bit plane data. The arrangement identifies the reference context bits on a same bit plane as that of the bit to be compressed. Then, provide the context model bits and the bit to be compressed to the mathematic encoder for encoding the bits and output a compressed data (step 804). The context model is one of that illustrated in FIG. 6, FIG. 7 or any other with a certain spacing of (number of bits of pixel-1) columns among the reference context bits.

As for the decompression process, the decoding method is reversed to the aforesaid encoding process. The compressed image data is provided to the decoder. The mathematic decoder with correspondent context modeler retrieves decompressed bit array. Then, the image transformer transforms the bit array into decompressed image data.

The aforesaid encoding and decoding processes applied to JBIG standard facilitate the image compression a higher compression ratio and less time-consumption. The process costs less and is free from time-consuming and low compression ratio of prior JBIG methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image compression apparatus, comprising:
   an image transformer, for transforming each pixel of an image data into binary bit array; bits of a same bit plane are located in a same column;
   a context modeler, coupled to said image transformer, includes a context model template and a context model; and
   a mathematic encoder, coupled to said context modeler, for encoding a bit to be compressed according to said context modeler and information provided by a plurality of reference context bits correspondent to said context model;
   wherein said plurality of reference context bits for said bit to be compressed are identified from said context model template according to numbers of bit planes of said bit array and shape of said context model; said bit to be compressed and said plurality of reference context bits are on a same bit plane.

2. The image compression apparatus according to claim 1 wherein said context model comprises column spacing.

3. The image compression apparatus according to claim 2 wherein number of said column spacing is determined by reduction one from number of bits represented for each image pixel.

4. The image compression apparatus according to claim 1 wherein number of said plurality of reference context bits correspondent to said context model is ten.

5. The image compression apparatus according to claim 1 wherein said plurality of reference context bits comprise at least position information of said bit to be compressed.

6. The image compression apparatus according to claim 1 wherein said plurality of reference context bits comprise at least color information of said bit to be compressed.

7. The image compression apparatus according to claim 1 wherein said plurality of reference context bits comprise at least position information of bits adjacent to said bit to be compressed.

8. The image compression apparatus according to claim 1 wherein said plurality of reference context bits comprise at least color information of bits adjacent to said bit to be compressed.

9. An image compression method applicable to a compression apparatus composed of an image transformer, a context modeler composed of a context model template and a context model, and an encoder, for compressing a plurality of pixels of an image, in which each pixel is represented by at least a bit with a color value and location in said image; every said bits are located on different bit planes; said method comprises steps of:

transforming all pixels of said image into a bit array comprising different bit planes each having a plurality of bits located in a same column;

determining a number of column spacing of context model according to said number of bits of each pixel;

determining a shape of context model correspondent to said context model template;

covering a range of reference context bits in said bit array for a bit to be compressed;

in the range, obtaining a plurality of reference context bits in a same bit plane of said bit to be compressed by using said context model; and encoding said bit to be compressed by using data of said reference context bits.

10. The image compression method according to claim 9 wherein said number of column spacing is determined by reduction one from number of bits represented for each image pixel.

11. The image compression method according to claim 9 wherein said plurality of reference context bits comprise at least position information of said bit to be compressed.

12. The image compression method according to claim 9 wherein said plurality of reference context bits comprise at least color information of said bit to be compressed.

13. The image compression method according to claim 9 wherein said plurality of reference context bits comprise at least position information of bits adjacent to said bit to be compressed.

14. The image compression method according to claim 9 wherein said plurality of reference context bits comprise at least color information of bits adjacent to said bit to be compressed.

* * * * *